(12) United States Patent
Chen et al.

(10) Patent No.: US 8,193,731 B2
(45) Date of Patent: Jun. 5, 2012

(54) PACKAGE OF CONSTANT-CURRENT SUPPLYING CHIP AND LED LAMP DRIVEN BY ALTERNATING CURRENT

(75) Inventors: Ying-Chia Chen, Qionglin Township, Hsinchu County (TW); Hui-Hua Lien, Qionglin Township, Hsinchu County (TW)

(73) Assignee: Ying-Chia Chen, Hsinchu County (TW)

( * ) Notice: Subject to any disclaimer, the term of this patent is extended or adjusted under 35 U.S.C. 154(b) by 279 days.

(21) Appl. No.: 12/721,100

(22) Filed: Mar. 10, 2010

(65) Prior Publication Data

US 2011/0169415 A1  Jul. 14, 2011

(30) Foreign Application Priority Data

Jan. 8, 2010 (TW) .............................. 99200304 U

(51) Int. Cl.
*G05F 1/00* (2006.01)
(52) U.S. Cl. ............... 315/291; 315/246; 315/169.1; 315/312; 323/229; 323/312; 345/39; 345/80; 345/77; 345/79; 361/18; 361/91.5; 361/93.9
(58) Field of Classification Search ............... 315/169.1, 315/169.3, 246, 291, 307, 312, 185 S; 323/229–231, 323/311, 312, 315; 345/80, 82, 39, 77, 79; 361/18, 82, 84, 91.5, 93.9
See application file for complete search history.

(56) References Cited

U.S. PATENT DOCUMENTS

| | | | | |
|---|---|---|---|---|
| 5,086,294 A | * | 2/1992 | Kasegi | 340/644 |
| 5,418,450 A | * | 5/1995 | Bacon | 324/110 |
| 7,741,788 B2 | * | 6/2010 | Ito et al. | 315/247 |
| 7,808,460 B2 | * | 10/2010 | Nakajima | 345/82 |
| 2011/0227481 A1 | * | 9/2011 | Chen et al. | 315/51 |

* cited by examiner

*Primary Examiner* — Haiss Philogene
(74) *Attorney, Agent, or Firm* — Muncy, Geissler, Olds & Lowe, PLLC

(57) ABSTRACT

An LED lamp driven by alternating current includes at least a first constant-current supplying device, at least a second constant-current supplying device and at least an LED load. A terminal of the first constant-current supplying device is connected to the first connecting terminal of the AC power source. A terminal of the second constant-current supplying device is connected to the second connecting terminal of the AC power source. The LED load is connected between the first constant-current supplying device and the second constant-current supplying device in series. Through the current limiting function of the first constant-current supplying device and the second constant-current supplying device, the LED lamp may be protected.

21 Claims, 5 Drawing Sheets

PACKAGE OF CONSTANT-CURRENT SUPPLYING CHIP AND LED LAMP DRIVEN BY ALTERNATING CURRENT

BACKGROUND OF THE INVENTION

1. Field of the Invention

The present invention is related to a package of a constant-current supplying chip and a light-emitting diode (LED) lamp, and more particularly to a package of a constant-current supplying chip and an LED lamp driven by alternating current.

2. Description of the Prior Art

LEDs (Light-Emitting Diodes) are known to be compact, durable and power-saving and hence are widely applied for various kinds of illuminations and decorations. A prior art LED module driven by direct current requires a rectifying circuit or a power converter in order to convert an AC (Alternating Current) power source into a DC (Direct Current) power source. Therefore, a larger PCB (Printed Circuit Board) is required to accommodate the rectifying circuit or the power converter, which results in the prior art LED module driven by direct current being less compact and demanding higher cost.

Another prior art LED module driven by alternating current includes at least two LEDs connected in anti-parallel fashion, and resistors connected between the LEDs and the AC power source. In such configuration, the alternating current in the first half cycle drives the LED with a polarity in the same direction, and the alternating current in the second half cycle drives the LED with a polarity in the opposite direction. Compared to an LED module driven by direct current, an LED module driven by alternating current has a simpler circuit, and therefore has a smaller size and requires lower cost.

However, connecting an LED module directly to an AC power source may damage the LED by a surge current from the AC power source. Even though the surge current may be limited by a resistor of a higher resistance to provide a better protection, a higher percentage of power is being dissipated as heat by the resistor of such higher resistance, and the LED would be driven by a smaller current, resulting in the LED module having a lower luminous efficiency. Besides, since the current is varying with the voltage, the luminous intensity of the LED is harder to be controlled effectively.

In summary, providing a constant current to the LED so as to avoid the LED module driven by alternating current to be damaged by a surge current is highly desirable.

SUMMARY OF THE INVENTION

The present invention is directed to providing a package of a constant-current supplying chip and an LED lamp driven by alternating current, particularly by configuring a constant-current supplying device between the AC power source and the LED to limit the maximum current applied to the LED, thereby protecting the LED.

According to an embodiment of the present invention, an LED lamp driven by alternating current includes at least a first constant-current supplying device, at least a second constant-current supplying device and at least a first LED load. A terminal of the first constant-current supplying device is connected to a first connecting terminal of an AC power source. The first constant-current supplying device includes a first constant-current supplying circuit and a first protecting circuit connected in parallel with the first constant-current supplying circuit, wherein the first constant-current supplying circuit allows the current in a first half cycle of the AC power source to pass through, and the first protecting circuit allows the current in a second half cycle of the AC power source to pass through. A terminal of the second constant-current supplying device is connected to a second connecting terminal of an AC power source. The second constant-current supplying device includes a second constant-current supplying circuit and a second protecting circuit connected in parallel with the second constant-current supplying circuit, wherein the second constant-current supplying circuit allows the current in the second half cycle of the AC power source to pass through, and the second protecting circuit allows the current in the first half cycle of the AC power source to pass through. The first LED load is connected between the first constant-current supplying device and the second constant-current supplying device.

According to another embodiment of the present invention, a package of a constant-current supplying chip is applied in the LED lamp driven by alternating current. The package of the constant-current supplying chip includes a first supporting base, a first constant-current supplying die, a second base, a second constant-current supplying die and an encapsulating body. The first supporting base and the second supporting base are electrically isolated. The first constant-current supplying die and the second constant-current supplying die are respectively disposed on and electrically connected with the first supporting base and the second supporting base, wherein, the first constant-current supplying die includes a first constant-current supplying circuit and a first protecting circuit mentioned above; the second constant-current supplying die includes a second constant-current supplying circuit and a second protecting circuit described previously. The encapsulating body encapsulates the first constant-current supplying die and the second constant-current supplying die.

The objective, technologies, features and advantages of the present invention will become apparent from the following description in conjunction with the accompanying drawings wherein are set forth, by way of illustration and example, certain embodiments of the present invention.

DESCRIPTION OF THE PREFERRED EMBODIMENT

Figure 1A:
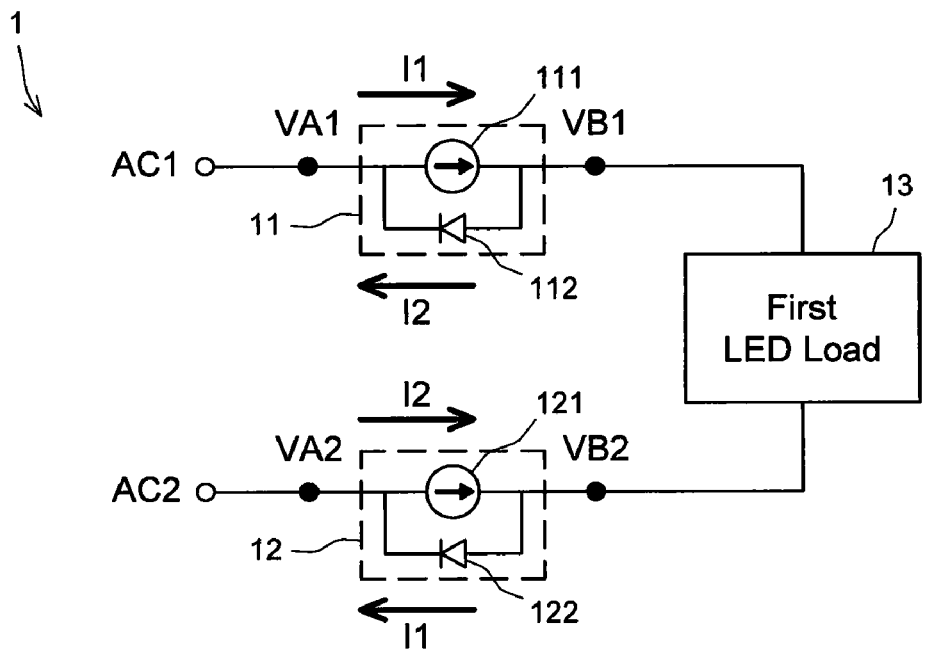
FIG. 1a is a schematic diagram illustrating the LED lamp driven by alternating current according to an embodiment of the present invention.

According to an embodiment in reference to FIG. 1a, the LED lamp driven by alternating current 1 includes at least a first constant-current supplying device 11, at least a second constant-current supplying device 12 and at least a first LED load 13 connected between the first constant-current supplying device 11 and the second constant-current supplying device 12. A terminal of the first constant-current supplying device 11 is connected to the first connecting terminal AC1 of an AC power source, so as to limit the maximum current to the first LED load 13 in the first half cycle (e.g. positive half cycle) of the AC power source. A terminal of the second constant-current supplying device 12 is connected to the second connecting terminal AC2 of the AC power source. Similarly, the second constant-current supplying device 12 limits the maximum current to the first LED load 13 in the second half cycle (e.g. negative half cycle) of the AC power source.

The first constant-current supplying device 11 includes a first constant-current supplying circuit 111 and a first protecting circuit 112 connected in parallel with the first constant-current supplying circuit 111. The first constant-current supplying circuit 111 allows the current I1 in the first half cycle of the AC power source to pass through, and the first protecting circuit 112 allows the current I2 in the second half cycle of the AC power source to pass through. The second constant-current supplying device 12 includes a second constant-current supplying circuit 121 and a second protecting circuit 122 connected in parallel with the second constant-current supplying circuit 121. The second constant-current supplying circuit 121 allows the current I2 in the second half cycle of the AC power source to pass through, and the second protecting circuit 122 allows the current I1 in the first half cycle of the AC power source to pass through.

For example, the first protecting circuit 112 may be a diode. When the polarity of the first connecting terminal AC1 of the AC power source is positive, the voltage at node VA1 is larger than that at node VB1, i.e. the first protecting circuit 112 is reverse-biased and is considered cutoff; meanwhile, the voltage at node VA2 is smaller than that at node VB2, i.e. the second protecting circuit 122 is forward-biased, and allows a huge amount of current to pass through. The maximum of the current passing through is limited by the first constant-current supplying circuit 111, and therefore, the current flowing through the whole circuit is controlled, and the first LED load 13 is thereby protected. On the other hand, when the polarity of the first connecting terminal AC1 of the AC power source is negative, the voltage at node VA1 is smaller than that at node VB1, i.e. the first protecting circuit 112 is forward-biased; meanwhile, the voltage at node VA2 is larger than that at node VB2, i.e. the second protecting circuit 122 is reverse-biased. Because of the current limiting effect of the second constant-current supplying circuit 121, the current flowing through the whole circuit is controlled, and the first LED load 13 is thus protected.

Figure 1B:
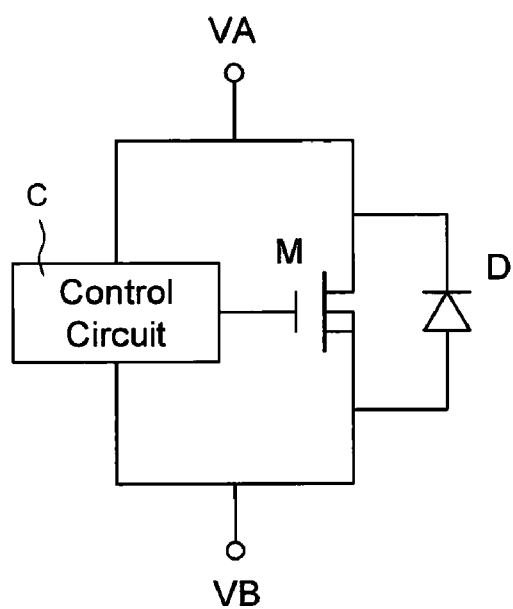
FIG. 1b is a schematic diagram illustrating the constant-current supplying device according to an embodiment of the present invention.

According to an embodiment in reference to FIG. 1b, the constant-current supplying circuit may include a MOSFET (Metal-Oxide-Semiconductor Field-Effect Transistor) M and a control circuit C. The control circuit C controls the MOSFET M to be in the conducting state (turn on) or cutoff state (turn off). The body diode D across the drain and source of the MOSFET M may be considered in parallel with the MOSFET M, so the body diode D may be used as the protecting circuit. For such configuration, when the voltage at node VA is larger than that at node VB, the control circuit turns on the MOSFET M, and the diode D is reverse-biased; as a result, the current flows through the MOSFET M to node VB. Owing to the device characteristics of the MOSFET M, the maximum current passing through is limited. It is noted that the diode D of the protecting circuit may also be an external diode, a static discharge protecting element, a BJT (Bipolar Junction Transistor), or etc.

It is noted that the first constant-current supplying device 11 and the second constant-current supplying device 12 may be but not limited to two independently packaged integrated circuits. The first constant-current supplying device 11 and the second constant-current supplying device 12 may also be a single package including two independent integrated circuits. As an example, the package of the constant-current supplying chip includes a first supporting base, a first constant-current supplying die, a second supporting base, a second constant-current supplying die and an encapsulating body. The first supporting base and the second supporting base are electrically isolated. The first constant-current supplying die includes a first constant-current supplying circuit and a first protecting circuit. The second constant-current supplying die includes a second constant-current supplying circuit and a second protecting circuit. The first constant-current supplying die and the second constant-current supplying die are respectively disposed on and electrically connected with the first supporting base and the second supporting base. The encapsulating body encapsulates the first constant-current supplying die and the second constant-current supplying die. According to an embodiment, the first supporting base may be a lead frame or a substrate; the second supporting base may be a lead frame or a substrate.

Figure 2A:
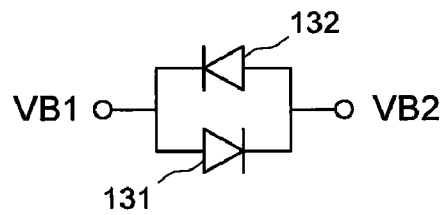
FIG. 2a-FIG. 2d are schematic diagrams illustrating the LED load according to different embodiments of the present invention.

The first LED load 13 may be implemented in many ways. According to an embodiment, the first LED load 13 includes a first LED 131 and a second LED 132 connected in anti-parallel with a first LED 131, as shown in FIG. 2a. When the voltage at node VB1 is larger than that at node VB2, the first LED 131 is forward-biased, whereas the second LED 132 is reverse-biased. Therefore, the current flows through the first LED 131 to node VB2, causing the first LED 131 to emit light. On the other hand, when the voltage at node VB1 is smaller than that at node VB2, the first LED 131 is reverse-biased, and the second LED 132 is forward-biased. As a result, the current flows through the second LED 132 to node VB1, resulting in the second LED 132 to illuminate.

Figure 2B:
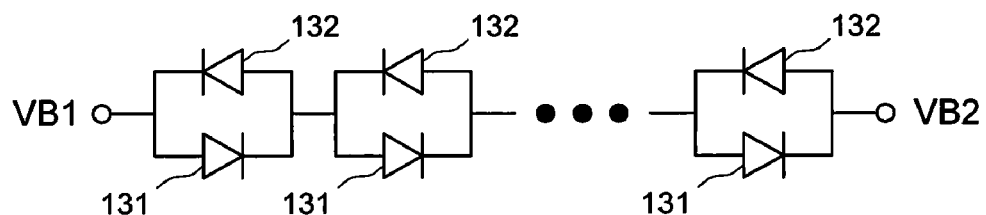

Connecting a plurality of LED modules, such as the LED module illustrated in FIG. 2a, in series forms an LED module as shown in FIG. 2b. By the same token, when the voltage at node VB1 is greater than that at node VB2, the first LED 131 is forward-biased and illuminates; when the voltage at node VB1 is smaller than that at node VB2, the second LED 132 is forward biased and illuminates.

Figure 2C:
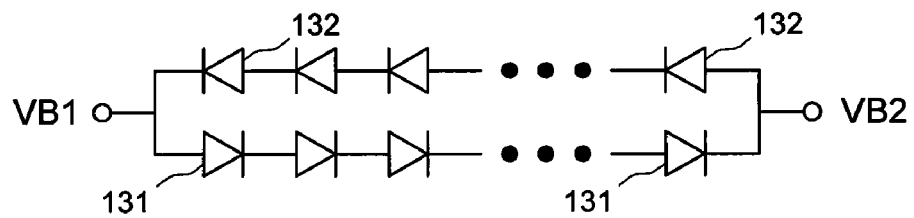

According to an embodiment in reference to FIG. 2c, the first LED load 13 includes a plurality of first LEDs 131 connected in series and a plurality of second LEDs 132 connected in series. The series-connected first LEDs 131 and the series-connected second LEDs 132 are connected in anti-parallel configuration. When the voltage at node VB1 is larger than that at node VB2, the first LEDs 131 are forward-biased and illuminate. When the voltage at node VB1 is less than that at node VB2, the second LEDs 132 are forward-biased and illuminate.

Figure 2D:
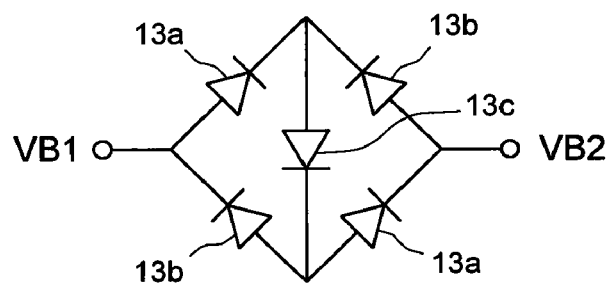

According to an embodiment in reference to FIG. 2d, the first LED load 13 includes a plurality of bridge-connected LEDs 13a, 13b, 13c. When the voltage at node VB1 is larger than that at node VB2, the LEDs 13a and 13c are forward-biased and illuminate. When the voltage at node VB1 is smaller than that at node VB2, the LEDs 13b and 13c are forward-biased and illuminate. It is noted that the number of the LED 13c may be a plural and is not limited to one.

Figure 3A:
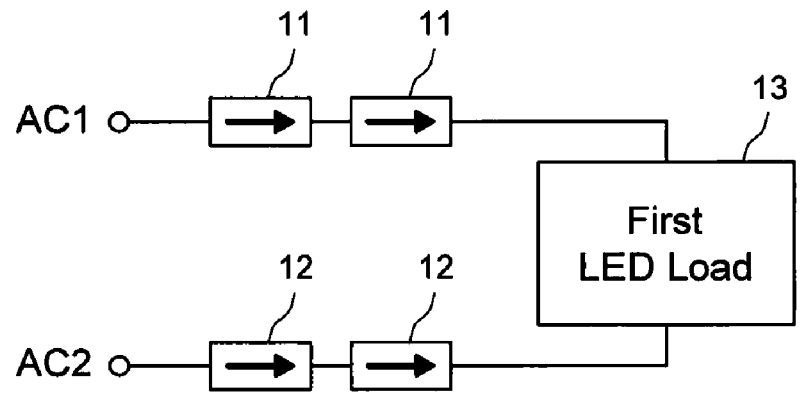
FIG. 3a and FIG. 3b are schematic diagrams illustrating the LED lamps driven by alternating current according to different embodiments of the present invention.
Figure 3B:
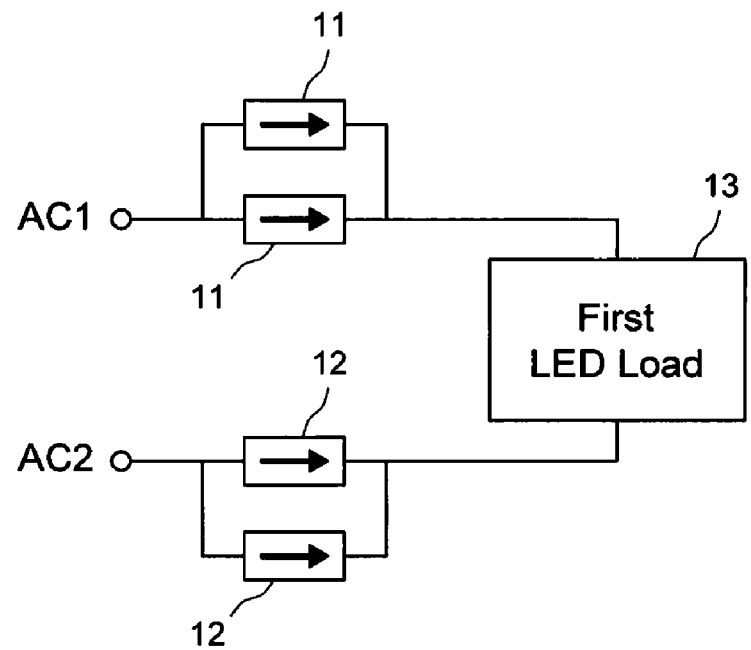

According to an embodiment in reference to FIG. 3a, the LED lamp may include a plurality of series-connected first constant-current supplying devices 11 and/or a plurality of series-connected second constant-current supplying devices 12. Connecting a plurality of constant-current supplying devices in series can enhance the voltage endurance of the LED lamp. According to an embodiment in reference to FIG. 3b, the LED lamp may include a plurality of parallel-connected first constant-current supplying devices 11 and/or a plurality of parallel-connected second constant-current supplying devices 12. Connecting a plurality of constant-current supplying devices in parallel can increase the amount of current that can pass through the LED lamp.

Figure 4:
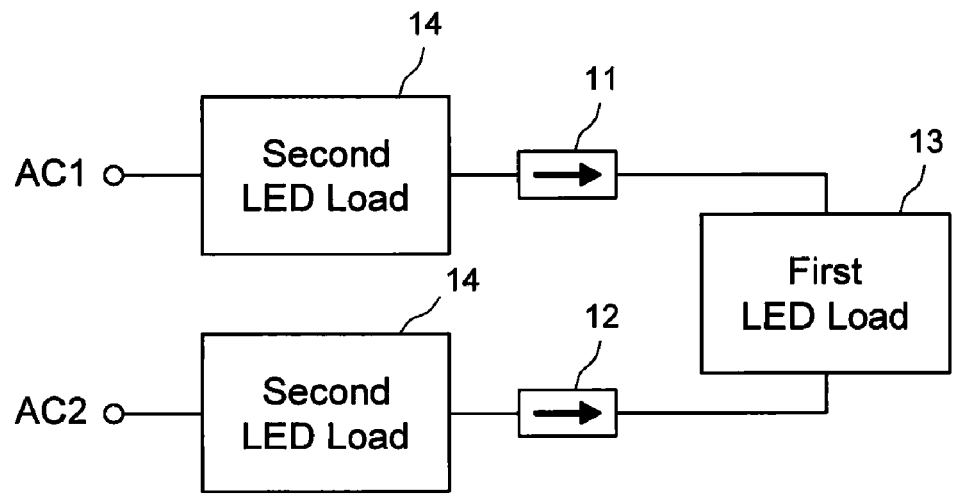
FIG. 4-FIG. 7 are schematic diagrams illustrating LED lamps driven by alternating current according to different embodiments of the present invention.

According to an embodiment in reference to FIG. 4, the LED lamp further includes at least a second LED load 14 which may be connected between the first constant-current supplying device 11 and the first connecting terminal AC1 of the AC power source, and/or between the second constant-current supplying device 12 and the second connecting terminal AC2 of the AC power source.

Figure 5:
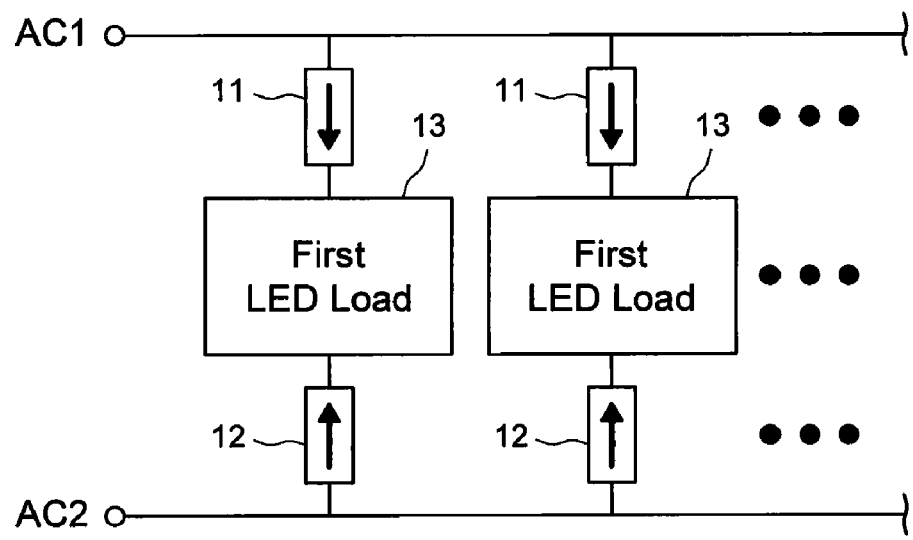
Figure 6:
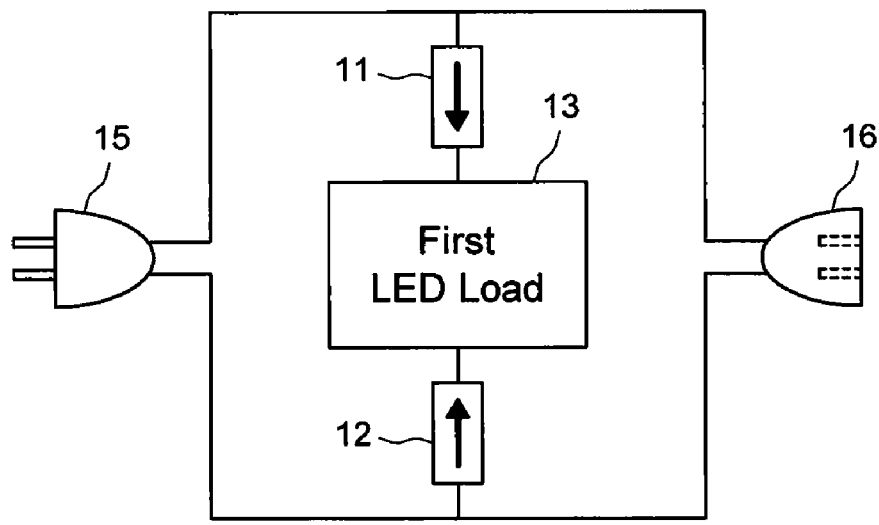

According to an embodiment in reference to FIG. 5, a plurality of LED lamps may be connected in parallel so as to provide an illuminating light source with a large area. According to another embodiment in reference to FIG. 6, the LED lamp includes a power connector 15 and a complimentary-type power connector 16. The power connector 15 is connected to the first connecting terminal and the second connecting terminal of the AC power source. Alternatively, the power connector 15 may connect with the complimentary-type power connector 16 of another LED lamp according to the present embodiment. For example, one application of the embodiment illustrated in FIG. 6 is to tailor the length of the LED lamps for various kinds of decoration targets. It is noted that the possible forms of the power connector of the LED lamp according to the present embodiment are plenty. For example, the power connector may be plug-type, screw-type or pin-type.

Figure 7:
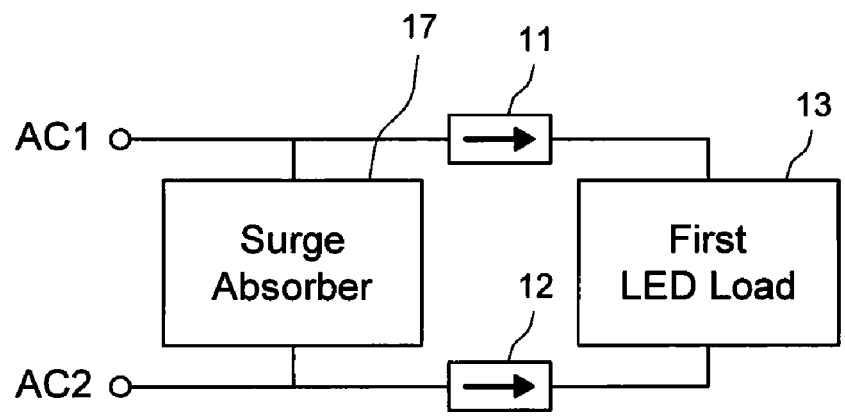

According to an embodiment in reference to FIG. 7, the LED lamp may further includes a surge absorber 17, which has a terminal connected to the node between the first constant-current supplying device 11 and the first connecting terminal AC1 of the AC power source, and another terminal connected to the node between the second constant-current supplying device 12 and the second connecting terminal AC2 of the AC power source. The surge absorber 17 may prevent the voltage between the first connecting terminal and the second connecting terminal from rising abruptly when a voltage spike or static discharge of the AC power source happens.

In summary, the package of the constant-current supplying chip and the LED lamp driven by alternating current according to the present invention configures a constant-current supplying device between the first connecting terminal/second connecting-terminal of the AC power source, and the LED, so as to limit the maximum current applied to the LED. Therefore, the LED lamp according to the present invention may prevent the LED from being damaged by extra large current, and may have a better power efficiency.

While the invention is susceptible to various modifications and alternative forms, a specific example thereof has been shown in the drawings and is herein described in detail. It should be understood, however, that the invention is not to be limited to the particular form disclosed, but to the contrary, the invention is to cover all modifications, equivalents, and alternatives falling within the spirit and scope of the appended claims.

What is claimed is:
1. An LED lamp driven by alternating current comprising:
at least a first constant-current supplying device, a terminal of which is connected to a first connecting terminal of an AC power source, wherein the first constant-current supplying device comprises:
a first constant-current supplying circuit allowing the current in a first half cycle of the AC power source to pass through; and
a first protecting circuit connected in parallel with the first constant-current supplying circuit, and allowing the current in a second half cycle of the AC power source to pass through;
at least a second constant-current supplying device, a terminal of which is connected to a second connecting terminal of the AC power source, wherein the second constant-current supplying device comprises:
a second constant-current supplying circuit allowing the current in the second half cycle of the AC power source to pass through; and
a second protecting circuit connected in parallel with the second constant-current supplying circuit, and allowing the current in the first half cycle of the AC power source to pass through; and
at least a first LED load, connected between the first constant-current supplying device and the second constant-current supplying device.

2. The LED lamp driven by alternating current according to claim 1, further comprising:
at least a second LED load connected between the first constant-current supplying device and the first connecting terminal of the AC power source.

3. The LED lamp driven by alternating current according to claim 1, further comprising:
at least a second LED load connected between the second constant-current supplying device and the second connecting terminal of the AC power source.

4. The LED lamp driven by alternating current according to claim 1, wherein the number of the first constant-current supplying device is a plural, and the plural constant-current supplying devices are connected substantially in series or in parallel.

5. The LED lamp driven by alternating current according to claim 1, wherein the second constant-current supplying device is a plural, and the plural constant-current supplying devices are connected substantially in series or in parallel.

6. The LED lamp driven by alternating current according to claim 1, wherein the first constant-current supplying circuit comprises a MOSFET (Metal-Oxide-Semiconductor Field-Effect Transistor) and a control circuit, wherein the control circuit controls the MOSFET to be in the conducting state or cutoff state; the first protecting circuit is the body diode of the MOSFET.

7. The LED lamp driven by alternating current according to claim 1, wherein the second constant-current supplying circuit comprises a MOSFET and a control circuit, wherein the control circuit controls the MOSFET to be in the conducting state or cutoff state; the second protecting circuit is the body diode of the MOSFET.

8. The LED lamp driven by alternating current according to claim 1, wherein the first protecting circuit comprises an external diode, a static discharge protecting element, a MOSFET or a BJT (Bipolar Junction Transistor).

9. The LED lamp driven by alternating current according to claim 1, wherein the second protecting circuit comprises an external diode, a static discharge protecting element, a MOSFET or a BJT.

10. The LED lamp driven by alternating current according to claim 1, further comprising a surge absorber, which has a terminal connected to the node between the first constant-current supplying device and the first connecting terminal of the AC power source, and another terminal connected to the node between the second constant-current supplying device and the second connecting terminal of the AC power source.

11. The LED lamp driven by alternating current according to claim 1, wherein the first LED load comprises;

a first LED; and a second LED connected in anti-parallel with the first LED.

12. The LED lamp driven by alternating current according to claim 1, wherein the first LED load comprises a plurality of LED modules connected in series, and each of the LED modules comprises:
   a first LED; and
   a second LED connected in anti-parallel with the first LED.

13. The LED lamp driven by alternating current according to claim 1, wherein the first LED load comprises:
   a plurality of first LEDs connected in series; and
   a plurality of second LEDs connected in series, and the plurality of series-connected second LEDs are connected in anti-parallel with the plurality of series-connected first LEDs.

14. The LED lamp driven by alternating current according to claim 1, wherein the first LED load comprises a plurality of bridge-connected LEDs.

15. The LED lamp driven by alternating current according to claim 1, wherein the first constant-current supplying device and the second constant-current supplying device are two independently packaged integrated circuits, or two independent integrated circuits in a single package.

16. The LED lamp driven by alternating current according to claim 1, further comprising a power connector which is plug-type, screw-type or pin-type.

17. The LED lamp driven by alternating current according to claim 1, further comprising a power connector and a complimentary-type power connector, wherein the power connector is connected with the first connecting terminal and the second connecting terminal of the AC power source, or is connected with the complimentary-type power connector of another of the LED lamp driven by alternating current.

18. A package of a constant-current supplying chip applied in an LED lamp driven by alternating current, comprising:
   a first supporting base;
   a first constant-current supplying die disposed on and electrically connected with the first supporting base, and comprising:
      a first constant-current supplying circuit allowing the current in a first half cycle of a AC power source to pass through; and
      a first protecting circuit connected in parallel with the first constant-current supplying circuit, and allowing the current in a second half cycle of the AC power source to pass through;
   a second supporting base electrically isolated from the first supporting base;
   a second constant-current supplying die disposed on and electrically connected with the second supporting base, and comprising:
      a second constant-current supplying circuit allowing the current in the second half cycle of the AC power source to pass through; and
      a second protecting circuit connected in parallel with the second constant-current supplying circuit, and allowing the current in the first half cycle of the AC power source to pass through; and
   an encapsulating body encapsulating the first constant-current supplying die and the second constant-current supplying die.

19. The package of the constant-current supplying chip according to claim 18, wherein the first supporting base and/or the second supporting base is a lead frame or a substrate.

20. The package of the constant-current supplying chip according to claim 18, wherein the first constant-current supplying circuit and/or the second constant current supplying circuit comprises a MOSFET and a control circuit, wherein the control circuit controls the MOSFET to be in the conducting state or cutoff state.

21. The package of the constant-current supplying chip according to claim 18, wherein the first protecting circuit and/or the second protecting circuit comprises the body diode of the constant-current supplying circuit, an external diode, a static discharge protecting element, or a BJT.

* * * * *